US005098243A

United States Patent [19]

Buck

[11] Patent Number: 5,098,243

[45] Date of Patent: Mar. 24, 1992

[54] TACKING STRIP AND METHOD

[75] Inventor: Ronald E. Buck, Brookfield, Ill.

[73] Assignee: Handy Button Machine Company, Melrose Park, Ill.

[21] Appl. No.: 687,083

[22] Filed: Apr. 18, 1991

Related U.S. Application Data

[63] Continuation of Ser. No. 386,291, Jul. 27, 1989, abandoned.

[51] Int. Cl.[5] .......... F16B 15/00

[52] U.S. Cl. .......... 411/466; 411/457

[58] Field of Search .......... 411/439, 458, 471, 472, 411/477, 470, 457, 461, 462, 463, 464, 466, 467; 16/16; 217/70

[56] References Cited

U.S. PATENT DOCUMENTS

| | | | |
|---|---|---|---|
| 410,038 | 8/1889 | Somborn | 411/461 |
| 450,753 | 4/1891 | Cary | 411/466 X |
| 705,626 | 7/1902 | Vogel | 411/467 X |
| 1,782,695 | 11/1930 | Prez | 411/457 X |
| 3,208,095 | 9/1965 | Hill | 16/16 |
| 4,682,925 | 7/1987 | Shields | 411/461 |

*Primary Examiner*—Rodney M. Lindsey

*Attorney, Agent, or Firm*—Trexler, Bushnell, Giangiorgi & Blackstone, Ltd.

[57] ABSTRACT

A tacking strip securing a fabric covering to upholstered furniture comprises the usual tack members and a margin or edge portion which has been cold-worked by rolling into a round or arcuate shape, thereby to decrease its sharpness to prevent the margin from cutting into the fabric.

3 Claims, 3 Drawing Sheets

TACKING STRIP AND METHOD

This application is a continuation of application No. 07/386,291, filed July 27, 1989, now abandoned.

BACKGROUND OF THE INVENTION

This invention relates to certain new and useful improvements in furniture components, and more particularly to a tacking strip for use in assembling upholstered furniture..

It is a common practice in the manufacture of upholstered furniture to secure the fabric covering of the furniture item with tacking strips. In some situations, however, it is necessary to position the upholstery fabric such that the fabric abuts an edge portion of the tacking strip. As a result, when tacking strips are so used, there is some substantial risk of tearing or snagging of the fabric. Also, the edge of the strip may be considered sharp, even though free if burrs. As such, a strip edge may cut or damage fabric when the latter is installed with a mallet.

To overcome this problem, it is common practice to provide a coating or plastic jacket that fits over the sharp margin so as to present a smooth surface to the fabric whereby the fabric is not objectionably cut by the sharp tacking strip margins.

OBJECTS AND SUMMARY OF THE INVENTION

An object of the present invention is to provide a novel tacking strip and method for making the same which eliminates the need for a plastic jacket or cover to shield the sharp edges of the tacking strip from the covering fabric.

Another object of the invention is to provide a tacking strip of the general type stated in which the margins of the tacking strip are cold-worked so that they are relatively dull as by rounding. As used herein, the term "cold-worked" includes all cold metal deforming processes which dull the edge including, but not limited to, swaging and scarfing. The finished edges of the strip do not present any substantial risk of piercing the upholstery fabric.

It is also an object of this invention to provide a method of making the tacking strip in which the margins thereof are cold-worked while the tacking strip is being stamped to provide tack members.

In accordance with the foregoing objects, the tacking strip has an elongated base, a series of tack members projecting from the base for retentive piercing engagement with upholstery material, said base having an edge portion spaced from the tack members and across which the upholstery material spans, said edge portion being normally sharp when the strip is severed from another piece of material, e.g., stock material; and said edge portion being cold-worked to a shape that dulls the sharpness thereof. Typically, the edge portion is rounded to work out the sharp edges.

The method of making the tacking strip comprises forming the tacking strip with an elongate base having tack members projecting from said base and adapted to pierce retentively upholstery material, and with the upholstery material spanning an edge portion of said base, which edge portion is normally sharp, as a result of the strip being severed from stock material, characterized by an improvement comprising cold-working the edge portion to round the same and thereby dull said edge portion to inhibit cutting by said edge portion of said upholstery fabric material.

Other objects of the invention will be apparent from the preceding and following description taken in conjunction with the accompanying drawing forming a part thereof.

DETAILED DESCRIPTION

Figure 1:
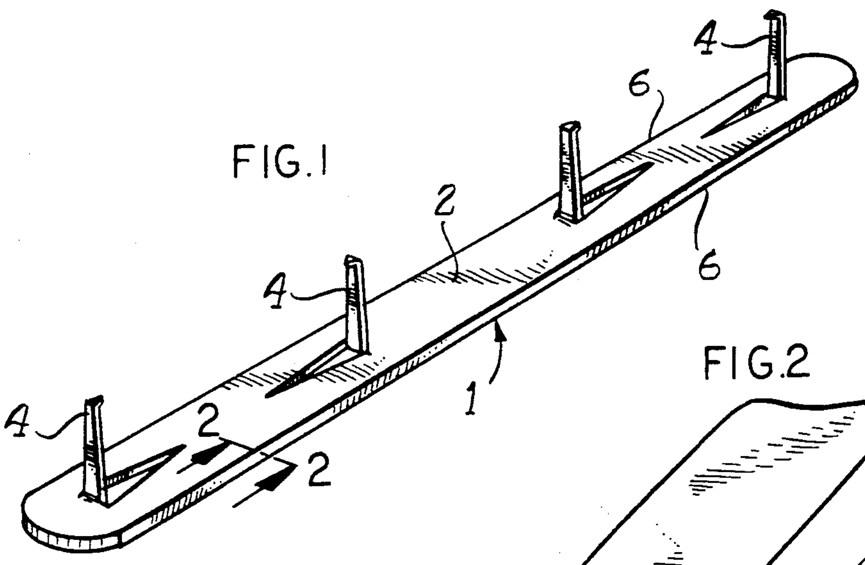
FIG. 1 is a perspective view of a tacking strip constructed in accordance with and embodying the present invention.
Figure 2:
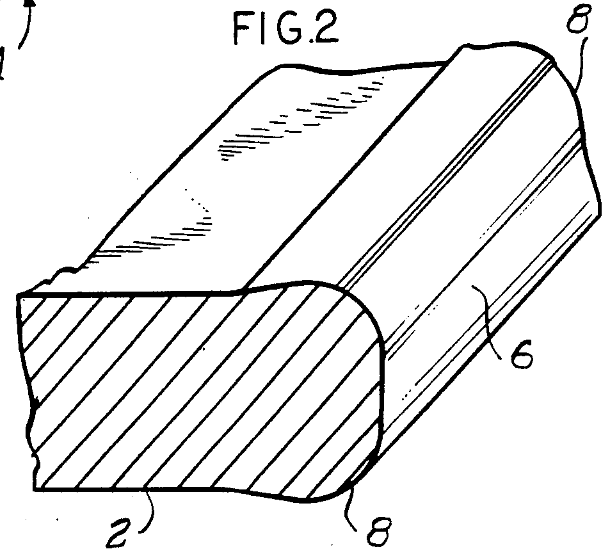
FIG. 2 is an enlarged fragmentary sectional view taken along the line 2—2 of FIG. 1.

Referring now in more detail and by reference characters to the drawing, which shows a preferred embodiment of the present invention, FIGS. 1 and 2 show a tacking strip 1 having an elongated base 2 from which are outwardly struck tacks 4 and edge portions 6, 6 which are spaced from the tacks 4. The edge 6 has sharp corners thereon rounded off as at 8, 8 by a suitable forming operation which functions simultaneously with the stamping operation that forms the tacking strip. The equipment for stamping out the strips with the tacks is conventional and is, therefore, not shown and described in detail herein. Furthermore, in accordance with conventional practice, the tacks 4 pierce the upholstery fabric (not shown) to hold the fabric in place.

Figure 3:
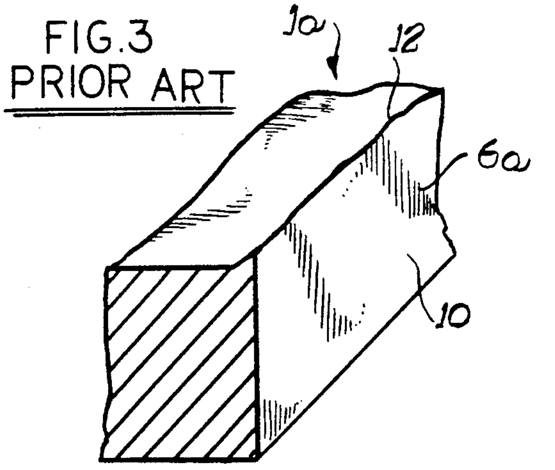
FIG.3 PRIOR ART
FIG. 3 and 4 are perspective and sectional views respectively of prior art in relation to the present invention.
Figure 4:
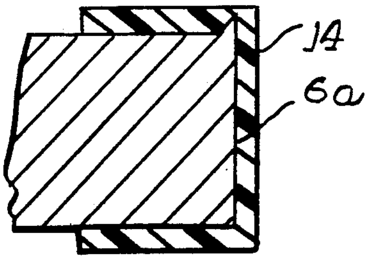
FIG.4 PRIOR ART
Figure 6:
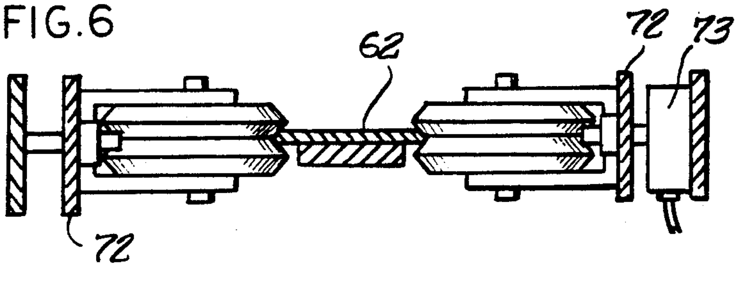
FIG. 6 is a fragmentary sectional view, on an enlarged scale, taken along line 6—6 of FIG. 5.

Referring now to FIGS. 3 and 4, the illustrated prior art shows a tacking strip 1*a* having sharp and roughened edge portions one of which is shown at 6*a*. A typical stamping operation leaves rough shear marks or scratches 10 as well as small burrs 12 close to one side of the plane of the margin 6*a*. Thus we have a sharp and rough work-hardened edge portion which is likely to cut into or snag the upholstery fabric. The problem is solved in the prior art as shown in FIG. 4 wherein a plastic sleeve 14 is extruded to shape, and adapted to be slid over the margin 6*a*.

Figures 5, 7, 8, 9, 10, 11, 12, 13, 14:
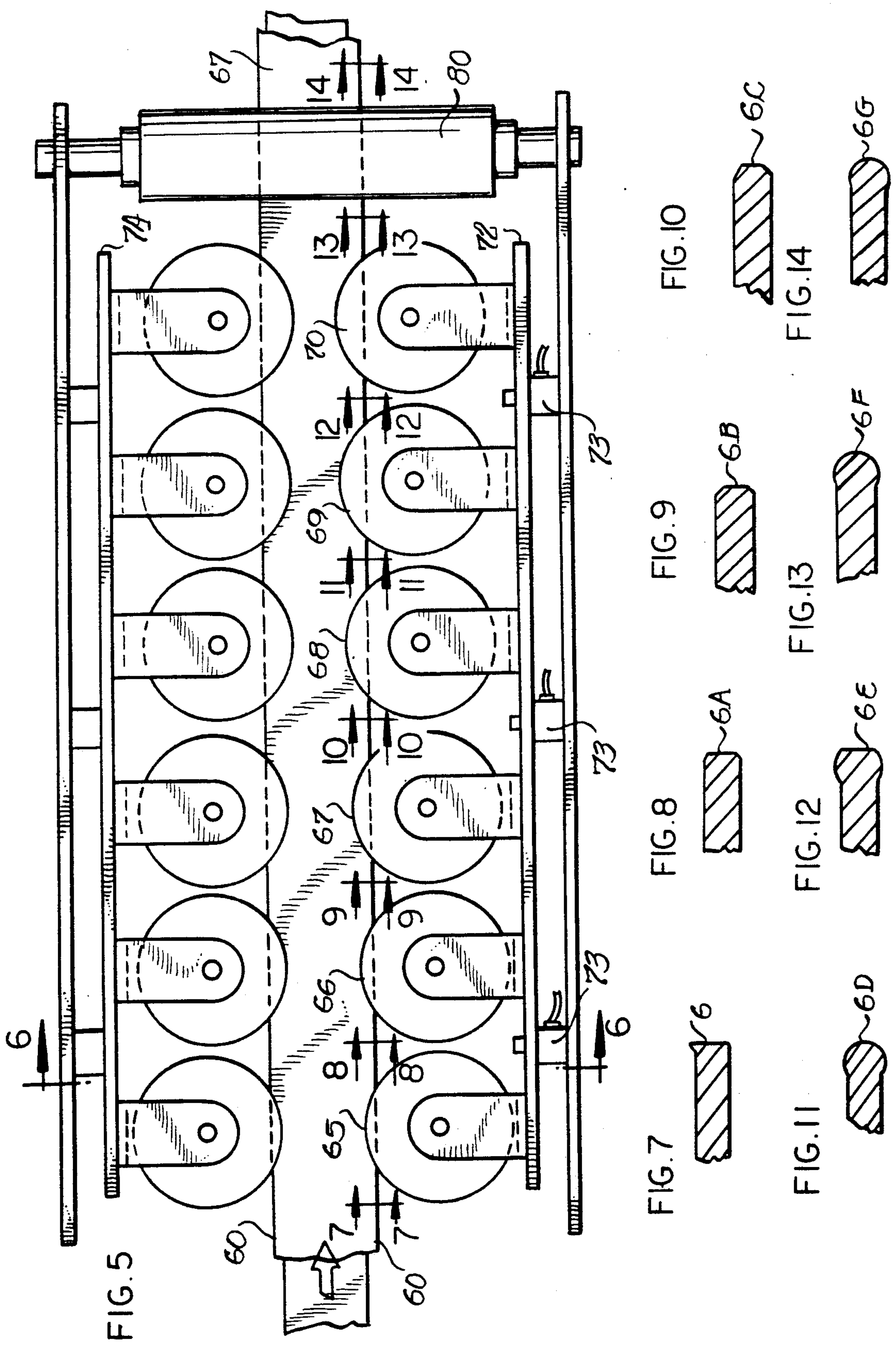
FIG. 5 is a schematic view in plan and showing pressure rollers used to cold-work the edge portions of the tacking strip to a rounded configuration.
FIGS. 7-14 represent diagrammatically typical cold-working steps to be utilized to round the edge portions of the tacking strip.

In contrast to the use of the nylon sleeve 14, the present invention contemplates a series of roller couples shown in FIG. 5 in which the margins 60, 60 are cold-worked by the roller couples due to the fact that the roller couples apply pressure against the margins of the stock material 62 from which the tacking strips are made. In the form of the invention shown, there are six roller couples, 65, 66, 67, 68, 69 and 70. The number of roller couples is not critical, and the present illustration is by way of example and not by way of limitation. In a typical arrangement, the rollers may be mounted on carriages 72, 74 and biased relatively toward each other by means of pneumatic cylinders 73. In actual practice the air cylinders 73 are all mounted on one side of the carriage 72. FIGS. 7 through 14 respectively show the approximate cross-section of the stock material at FIGS. 7—7 through 14—14, respectively. In FIG. 7 there is shown the sharp margin 6 of the prior art which needs to be coated with plastic. In FIG. 8, there is a slight working of the corners, whereas in FIG. 9 there is further working of the corners. FIG. 10 shows a still further working of the corners, with the result that there is a progressive working of the margins 6A, 6B, 6C to produce the forms shown in the drawings. FIGS. 11-14 will show the margin forms 6D, 6E, 6F and 6G as further working toward the working of a generally arcuate shape bead 6G, which is less than 360° and more than 180°. The progressive cold-working not only produces the rounded or dull edge corners, but also substantially eliminates the shear or scratch marks 10 so that the edge 6 is provided with a smooth surface. Finally, there is a stock flattener 80 for flattening any stock which is bent by the forming rollers.

Figure 15:
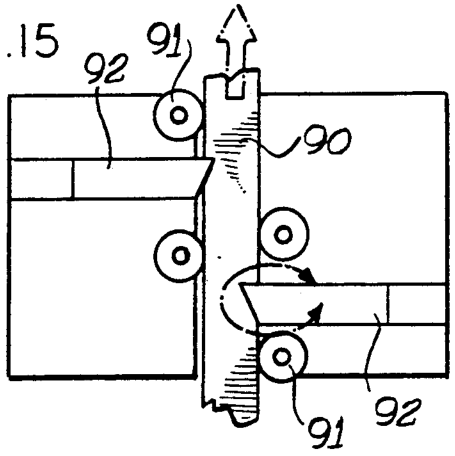
FIG. 15 is a fragmentary plan view somewhat diagrammatic of apparatus which performs an alternate form of cold-working within the scope of this invention.
Figure 16:
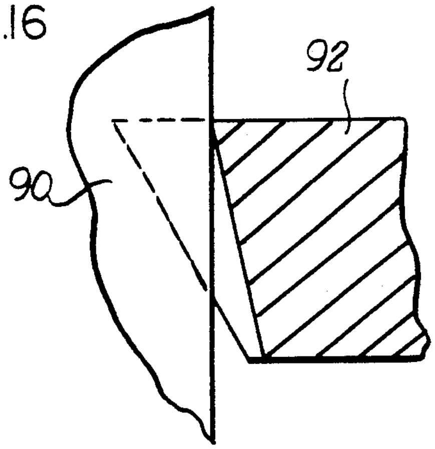
FIG. 16 is an enlarged view of a portion of FIG. 15 and in partial section.
Figure 17:
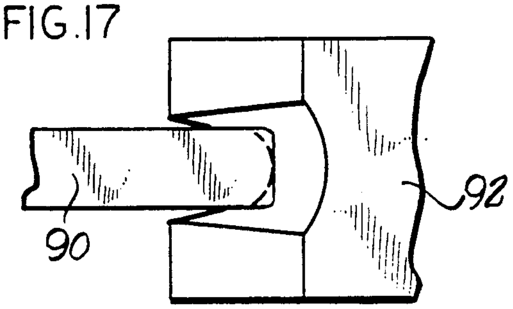
FIG. 17 is a fragmentary elevational view of the structure of FIG. 16.

FIGS. 15-17 shows the edge dulling process that includes swaging. The stock material 90, passes between rollers 91 and across swaging tool 92.

Figure 18:
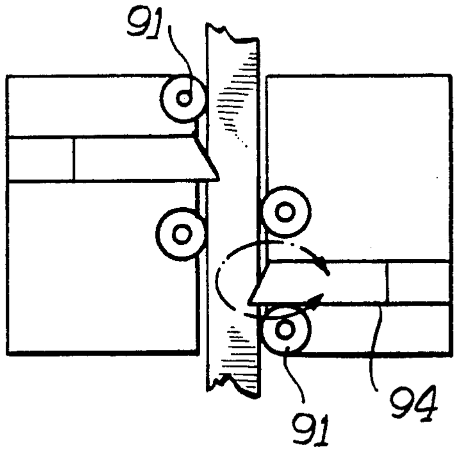
FIG. 18 is a fragmentary plan view, somewhat diagrammatic in nature and showing apparatus for performing a further form of the invention.
Figure 19:
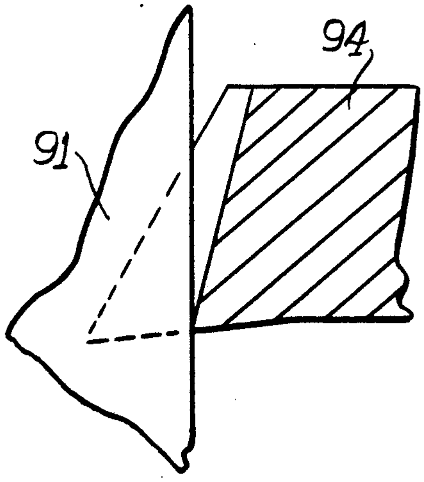
FIG. 19 is an enlarged fragmentary portion of the apparatus used to scarf the margin of the strip.
Figure 20:
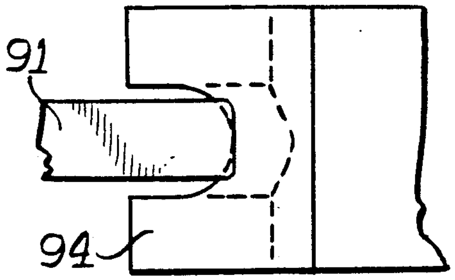
FIG. 20 is an elevational view of the structure of FIG. 19.

FIGS. 18-20 are similar to FIGS. 15-17, however FIGS. 18-20 show a scarfing tool 94, that removes a small amount of metal as it reshapes the edge.

What is claimed is:

1. An upholstery tacking strip formed from sheet metal stock material as an elongated sheared stamping with initial residual rough and burred opposed lengthwise edge portions and each with included lengthwise corner edges which are smoothed and dulled to prevent damage to applied upholstery material; said stamping comprising an elongated planar surfaced sheet metal base member presenting intermediate spaces between said opposed lengthwise smooth corner edges which are angled from the adjacent planar surfaces of the intermediate spaces of the base member permitting either of said lengthwise edge portions of the base member to assume a predetermined assembly position to receive the upholstery material without damaging the same; each of said edge portions comprising a bead which is greater than 180° but less than 360°; and a series of tack members struck from the intermediate space to upstand from the adjacent planar surface thereof and spaced inwardly from and independently of the opposed lengthwise corner edges thereof for retentive piercing engagement with the upholstery material applied thereto in lapping contact with the edge portions and corner edges which prevent damage to the thusly applied upholstery material regardless of which lengthwise edge portion is initially placed in the predetermined assembly position.

2. A tacking strip according to claim 1 wherein said edge portions are cold-worked to dull the sharpness thereof.

3. An upholstery tacking strip according to claim 1 wherein each edge portion comprises a generally arcuate bead with its transverse surface disposed outwardly of the planar surfaces of the sheet metal base member.

* * * * *